United States Patent
Takahata et al.

(10) Patent No.: US 6,498,777 B2
(45) Date of Patent: Dec. 24, 2002

(54) OPTICAL RECORDING MEDIUM HAVING A LAND HEIGHT RATIO

(75) Inventors: Hiroaki Takahata, Tokyo (JP); Hisaji Oyake, Tokyo (JP)

(73) Assignee: TDK Corporation, Tokyo (JP)

( * ) Notice: Subject to any disclaimer, the term of this patent is extended or adjusted under 35 U.S.C. 154(b) by 84 days.

(21) Appl. No.: 09/845,273

(22) Filed: May 1, 2001

(65) Prior Publication Data

US 2001/0040865 A1 Nov. 15, 2001

(30) Foreign Application Priority Data

May 11, 2000 (JP) ........................................ 2000-138683

(51) Int. Cl.[7] ................................................ G11B 3/70
(52) U.S. Cl. ....................................................... 369/280
(58) Field of Search ........................................ 369/280

(56) References Cited

U.S. PATENT DOCUMENTS 5,602,824 A * 2/1997 Ooki et al. ............... 369/275.1

FOREIGN PATENT DOCUMENTS

| JP | 11-126372 | 5/1999 |
|---|---|---|
| JP | 2000-11460 | 1/2000 |

* cited by examiner

*Primary Examiner*—George J. Letscher
(74) *Attorney, Agent, or Firm*—Oblon, Spivak, McClelland, Maier & Neustadt, P.C.

(57) ABSTRACT

In an optical recording medium comprising a substrate including parallel extending lands and grooves on one surface thereof, the grooves serving as recording tracks, and the lands being formed with prepits, the height $H_P$ of the land disposed between the prepit and the groove divided by the height $H_L$ of the land in a prepit-free region, both as measured from the groove bottom, i.e., $H_P/H_L$ ranges from 0.25 to less than 1. This enables to significantly increase the recording density of the medium without a substantial cost increase.

3 Claims, 2 Drawing Sheets

OPTICAL RECORDING MEDIUM HAVING A LAND HEIGHT RATIO

BACKGROUND OF THE INVENTION

1. Field of the Invention

This invention relates to an optical recording medium.

2. Prior Art

Optical recording media include write-once disks using organic dyes as the recording material such as CD-R and DVD-R and rewritable disks using phase change recording materials such as CD-RW and DVD-RW. These optical recording media have recording layers formed on disk substrates which are provided on the surface with (guide) grooves for tracking and other purposes. Among these media, DVD-R and DVD-RW capable of higher density recording have address information-bearing prepits formed in raised regions (commonly referred to as lands) between adjacent grooves. Optical disks having prepits formed in lands are disclosed, for example, in JP-A 2000-11460 and 11-126372.

In optical recording media having grooves and prepits formed therein wherein the grooves serve as recording tracks, write/read operation is carried out along the grooves. It is believed that write/read characteristics are largely affected by the shape of the grooves and prepits.

The invention pertains to an optical recording disk of the structure comprising a substrate provided with grooves and lands and a recording layer containing an organic dye thereon, the grooves serving as recording tracks and the lands being formed with prepits. The disk substrate with grooves and lands is often prepared by the injection molding of resin using a stamper. The inventors attempted to prepare such disk substrates by changing many parameters including those associated with the stamper manufacturing step.

Now a common process for the preparation of a disk substrate is described. The disk substrate is prepared by the injection molding of resin using a stamper bearing a negative prepit and groove pattern. The stamper is often formed of nickel. In order to manufacture the stamper, an optical disk master is first prepared. The following process is generally employed for preparing the optical disk master. First, a photoresist layer is applied on the surface of a glass substrate. The photoresist layer is exposed to a laser beam to form a latent image of the desired pattern, followed by development.

Using the optical disk master, a stamper is manufactured usually by the following process. First, to impart electric conductivity to the surface of the photoresist layer on the optical disk master, a metal thin film of nickel or the like is formed as by sputtering or electroless plating. Electroforming is then effected to deposit a film of nickel or the like on the metal thin film. Then the laminate of the metal thin film and the electroformed film is stripped from the photoresist layer. The laminate is ready for use as the stamper master. This stamper master may be used as the stamper directly, although a stamper mother may be prepared from the stamper master and used as the stamper. The stamper mother is prepared by electroforming a film on the surface of the stamper master and stripping the electroformed film. It is recommended to previously oxidize the surface of the stamper master so that the electroformed film may be readily stripped therefrom. Alternatively, a stamper child may be similarly prepared using the stamper mother and used as the stamper.

In the process of preparing an optical disk master, the minimum width of the latent image pattern formed in the photoresist layer is limited by the diameter of a laser beam spot. The beam spot diameter w is represented by $w=\lambda/NA$ wherein $\lambda$ is the wavelength of the laser beam, NA is the numerical aperture of an objective lens in an optical system. In forming a latent image pattern corresponding to the groove, the photoresist layer is helically scanned with the laser beam.

When prepits are to be formed between grooves, two laser beams were used in the step of forming the latent image pattern. One laser beam is continuously irradiated to form a groove pattern and the other laser beam is intermittently irradiated to form a prepit pattern. The laser beam defines a beam spot having a Gaussian intensity distribution. In the event that the track pitch is narrowed in order to achieve a higher recording density, the perimeters of two laser beams overlap (that is, the skirts of two Gaussian distributions overlap) near the region which is simultaneously exposed to two laser beams, that is, the prepit-forming region. The dose of exposure can exceed the threshold in the overlapped area. The area where the dose of exposure has exceeded the threshold is removed upon development so that the land is lowered in height. A lowering of the land leads to increased errors.

To prevent the land from lowering its height, the size of the beam spot may be reduced in accordance with the distance between the groove and the prepit. This is achieved by either reducing the wavelength of a laser beam or increasing the numerical aperture of an objective lens in a laser beam recorder. As to the laser wavelength, a blue laser of short wavelength has been used in practice. Then, a laser beam of a shorter wavelength, for example, in the ultraviolet region must be used. On use of a laser beam in the ultraviolet region, however, optical components including the objective lens should be changed to those capable of complying with the ultraviolet region. This gives rise to a serious problem that a substantial modification of the system is needed.

SUMMARY OF THE INVENTION

An object of the invention is to provide an optical recording medium having grooves serving as recording tracks and prepits formed between adjacent grooves wherein the potential occurrence of errors due to an increase of recording density is minimized without a substantial cost increase.

The invention provides an optical recording medium comprising a substrate including lands and grooves extending substantially parallel on one surface thereof, the grooves serving as recording tracks, and the lands being formed with prepits. The height $H_P$ of the land disposed between the prepit and the groove and the height $H_L$ of the land in a prepit-free region, both as measured from the bottom of the groove in a cross section perpendicular to the substrate surface, satisfy the relationship: $0.25 \leq H_P/H_L < 1$.

In a preferred embodiment, the grooves are arranged at a pitch P, and the distance from the center of the prepit to the centerline of one adjacent groove is r, the pitch P and the distance r satisfying the relationship: $0.4 \leq r/P \leq 0.6$.

The optical recording medium may further include a recording layer containing an organic dye on the substrate surface.

DESCRIPTION OF THE PREFERRED EMBODIMENT

Figure 1A:
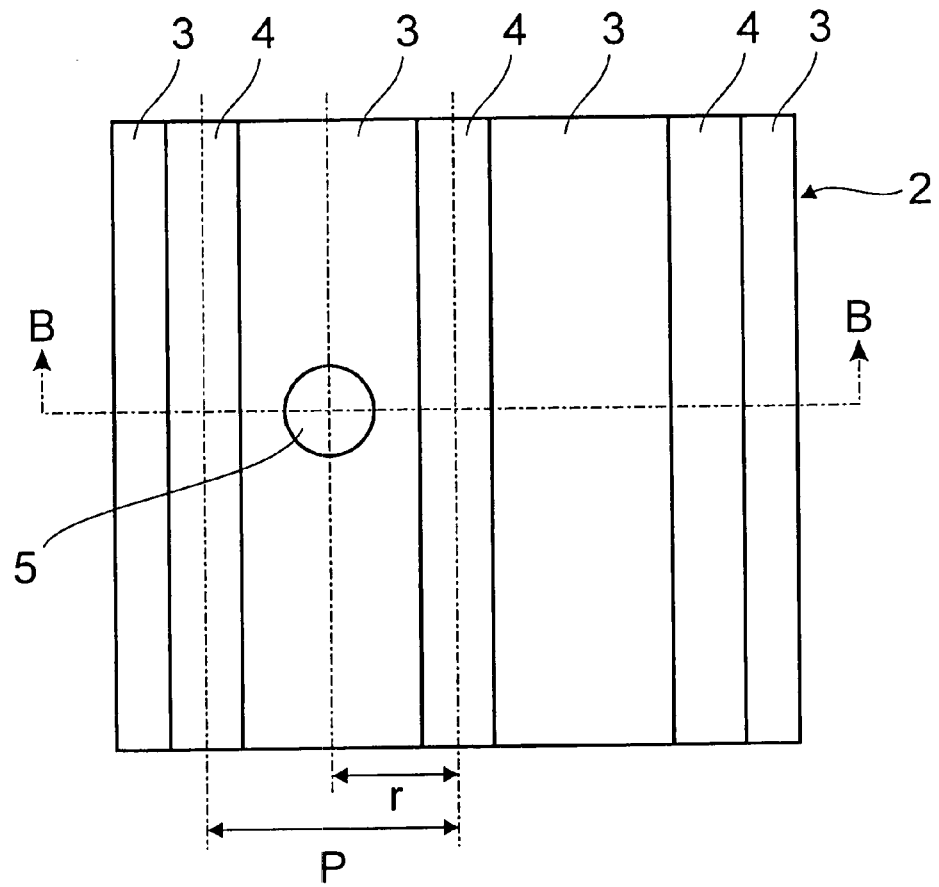
FIG. 1A is a plan view of a substrate of an optical recording medium according to the invention.
Figure 1B:
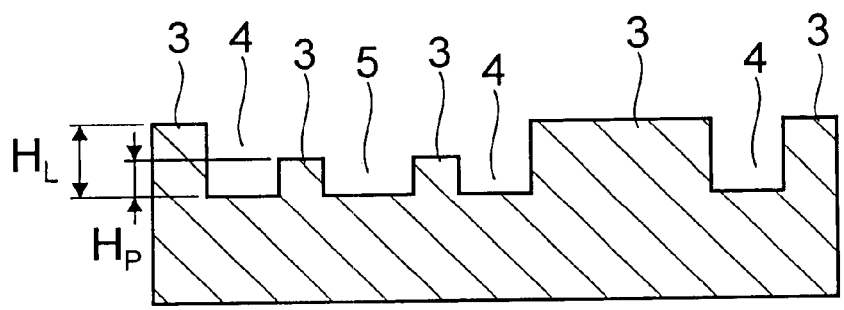
FIG. 1B is a cross-sectional view taken along lines B—B in FIG. 1A.

Referring to FIGS. 1A and 1B, there is illustrated a portion of a substrate 2 having a surface on which a recording layer is to be formed and in which lands 3 and grooves 4 extend substantially parallel to each other. The lands and grooves are illustrated as longitudinal strips. Each groove 4 has a centerline (depicted by dot-and-dash lines) longitudinally extending at the center in a transverse direction of the groove. A prepit 5 is formed in the land 3. The prepit 5 illustrated has a circular shape in plan view.

As best shown in the cross-sectional view perpendicular to the substrate surface in FIG. 1B, the groove has a bottom and the land has a height as measured from the groove bottom. The land 3 disposed between the prepit 5 and the groove 4 has a height $H_P$, and the land 3 in a prepit-free region (that is, region spaced apart from the prepit 5) has a height $H_L$. According to the invention, the relationship: $0.25 \leq H_P/H_L < 1$ should be met.

As previously described in connection with the process of preparing an optical disk master for use in the manufacture of media having prepits between adjacent grooves, if a laser beam having a relatively large spot diameter is used for latent image pattern formation, $H_P$ becomes small as compared with $H_L$. As a result, many errors occur upon reading signals in proximity to the prepit. However, it becomes a terrible burden to reduce the spot diameter of a laser beam used in forming a latent image pattern, so as to comply with the increased recording density. By contrast, as a result of experimentation on optical recording disks having a recording layer containing an organic dye, the inventors have found that the occurrence of errors can be suppressed to an acceptable level by setting the $H_P/H_L$ in the range from 0.25 to less than 1. That is, there is no need for setting $H_P=H_L$. Therefore, when the invention is applied, the recording density of an optical recording medium can be significantly improved without a need for substantial modification of an optical disk master producing apparatus. From the standpoint of achieving a high recording density medium using a laser beam with a relatively large spot diameter, it is preferred to set $H_P/H_L \leq 0.8$, and especially $H_P/H_L \leq 0.5$.

Referring to FIG. 1A again, the grooves 4 are arranged at a pitch P, and the distance from the center of the prepit 5 to the centerline of one adjacent groove 4 is "r." In one preferred embodiment, the pitch P and the distance r satisfy the relationship: $0.4 \leq r/P \leq 0.6$. By setting $H_P/H_L$ within the above-defined range and locating the prepit within this range, the occurrence of errors is minimized. It is noted that at r/P=0.5, that is, when the prepit is located at the center between two adjacent grooves, the land portions flanking the prepit have a substantially equal height. When the prepit is located closer to one groove than to the other groove, the land portion on the side of the shorter prepit-groove distance has a lower height. Even in this case, $0.25 \leq H_P/H_L$ should be met on either side of the prepit.

In the practice of the invention, the land height $H_L$ (or groove depth) and the groove width are not critical. They may be determined as appropriate in accordance with the wavelength of write/read beam and the material of the recording layer and so as to avoid any tracking error signal or any problem of modulation. Specifically, in a medium using an organic dye as the recording material, the land height $H_L$ is preferably set in the range from $\lambda/4n$ to $\lambda/2n$ wherein $\lambda$ is the wavelength of write/read beam and n is the refractive index of the substrate at the wavelength $\lambda$. An appropriate groove width is from 0.25P to 0.75P. Also the groove arrangement pitch P is not critical. It is preferred to set the groove pitch P in the range of 0.5 to 1.0 µm because better results are obtained with a smaller groove pitch P.

The substrate may be formed of any desired material. For example, various resins such as polycarbonate, polymethyl methacrylate and polyolefins are useful.

The invention is applicable to optical recording media of the type entailing groove recording, for example, write-once media using organic dyes as the recording material and rewritable media using phase change recording materials. Better results are obtained particularly when the invention is applied to write-once media using organic dyes as the recording material. The write-once media are generally of the structure having on a substrate, a recording layer containing an organic dye such a phthalocyanine, cyanine or azo dye and a reflecting layer thereon of gold, gold alloy, silver or silver alloy. The rewritable media are generally of the structure having a first dielectric layer, a recording layer of phase change recording material such as Ag—In—Sb—Te or Ge—Sb—Te, a second dielectric layer, and a reflective layer stacked on a substrate in the described order. When the invention is applied to these media, the components other than the substrate are not critical and may be the same as in prior art media.

EXAMPLE

Examples of the invention are given below by way of illustration and not by way of limitation.

Example 1

Figure 2:
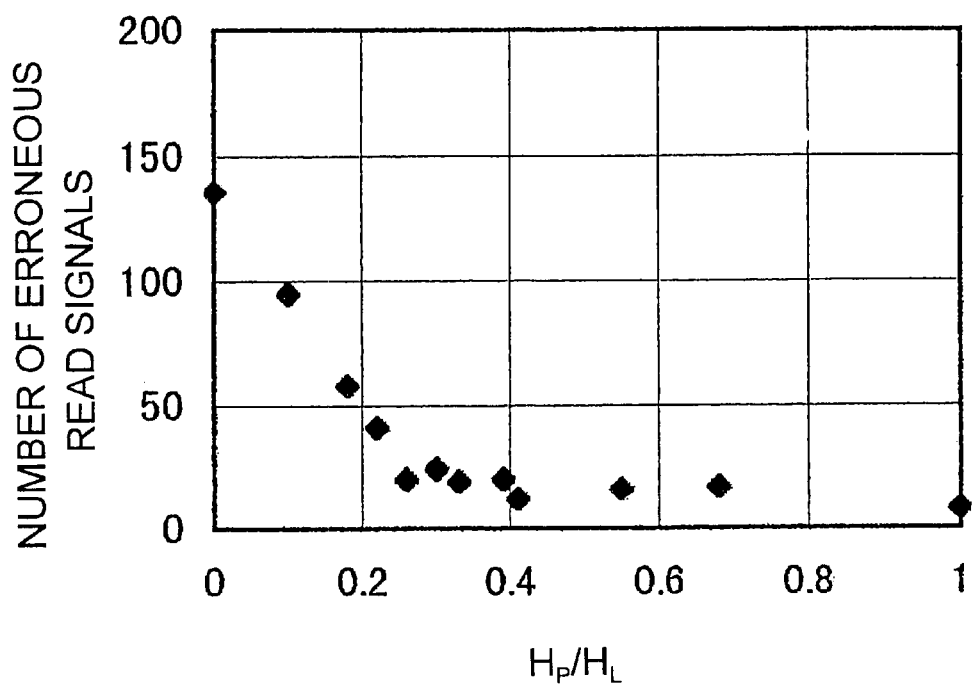
FIG. 2 is a graph showing the number of erroneous read signals as a function of the height $H_P$ of the land near a prepit divided by the height $H_L$ of the land spaced apart from the prepit, $H_P/H_L$.

By injection molding of polycarbonate, there were prepared disk-shaped substrates of 120 mm in diameter and 0.6 mm thick in which grooves and prepits were formed simultaneous with the injection molding. On the surface of the PC substrates, a recording layer of cyanine organic dye having a thickness of 130 nm, a reflective layer of silver alloy having a thickness of 150 nm, and a protective layer of resin having a thickness of 7 µm were formed in the described order. In this way, there were prepared optical recording disk samples having $H_P/H_L$ values from 0 to 1 as shown in FIG. 2. The value of $H_P/H_L$ was varied by changing the numerical aperture of an objective lens in a laser beam recorder optical system and the exposure dose during the manufacture of an optical disk master. The land height $H_L$ was 160 nm, the groove pitch P was 0.74 µm, and the groove width was 0.3 µm.

On these samples, write and read operations were carried out by means of an optical recording medium tester using an objective lens with a numerical aperture of 0.60 and a laser beam with a wavelength of 635 nm. The number of erroneous read signals was counted, with the results shown in the diagram of FIG. 2.

As is evident from FIG. 2, setting $H_P/H_L$ at 0.25 or greater can suppress the number of errors to a level equal to the case of $H_P/H_L=1$.

Example 2

Figure 3:
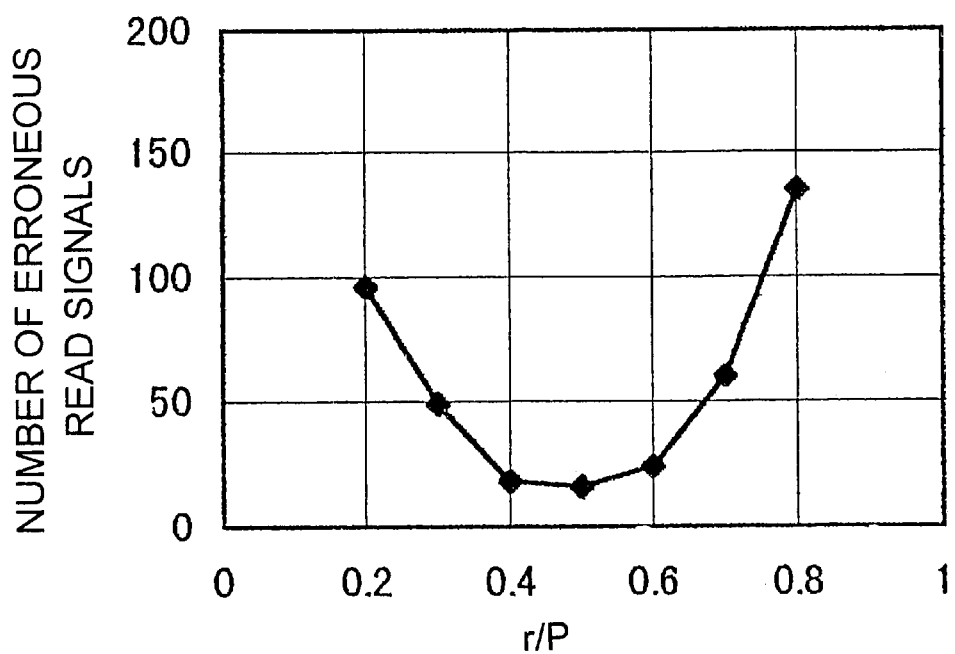
FIG. 3 is a graph showing the number of erroneous read signals as a function of the location of the prepit, r/P.

Optical recording disk samples were prepared as in Example 1 except that the value of r/P representative of the location of the prepit was changed from 0.2 to 0.8 as shown in FIG. 3. The disk samples were similarly tested to count the number of errors, with the results shown in the diagram of FIG. 3. It is seen from FIG. 3 that the number of errors marks a critical decline in the range of $0.4 \leq r/P \leq 0.6$.

It is noted that in Example 2, $H_P/H_L \geq 0.25$ prevailed over the entire range of $0.4 \leq r/P \leq 0.6$. Specifically, $H_P/H_L$ was 0.35 when the prepit was located at the center between grooves, that is, $r/P=0.5$.

BENEFITS OF THE INVENTION

The invention permits the land to lower its height around the prepit and sets the percent lowering of the land height within a specific range. This enables to significantly increase the recording density of an optical recording disk without substantial modification of the optical disk master production apparatus.

Japanese Patent Application No. 2000-138683 is incorporated herein by reference.

Reasonable modifications and variations are possible from the foregoing disclosure without departing from either the spirit or scope of the present invention as defined by the claims.

What is claimed is:

1. An optical recording medium comprising a substrate including lands and grooves extending substantially parallel on one surface thereof, the grooves serving as recording tracks, and the lands being formed with prepits, wherein the height $H_P$ of the land disposed between the prepit and the groove and the height $H_L$ of the land in a prepit-free region, both as measured from the bottom of the groove in a cross section perpendicular to the substrate surface, satisfy the relationship: $0.25 \leq H_P/H_L \leq 1$.

2. The optical recording medium of claim 1 wherein the grooves are arranged at a pitch P, and the distance from the center of the prepit to the centerline of one adjacent groove is r, the pitch P and the distance r satisfying the relationship: $0.4 \leq r/P \leq 0.6$.

3. The optical recording medium of claim 1 further comprising a recording layer containing an organic dye on the substrate surface.

* * * * *